C. A. BUFFINGTON.
TIRE SAVING JACK.
APPLICATION FILED MAR. 27, 1915.
1,172,934.
Patented Feb. 22, 1916.
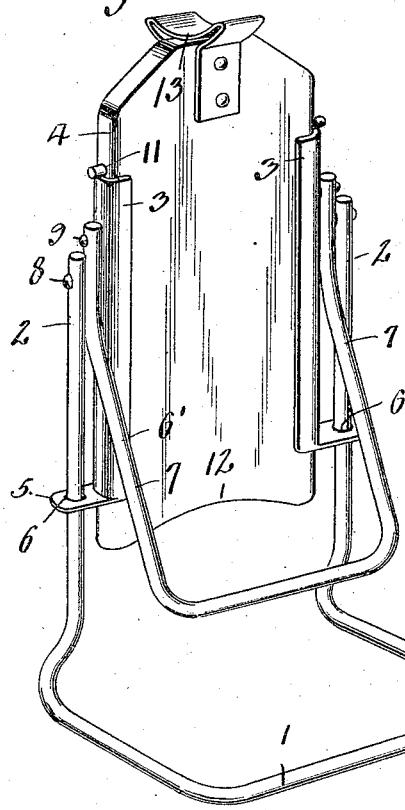
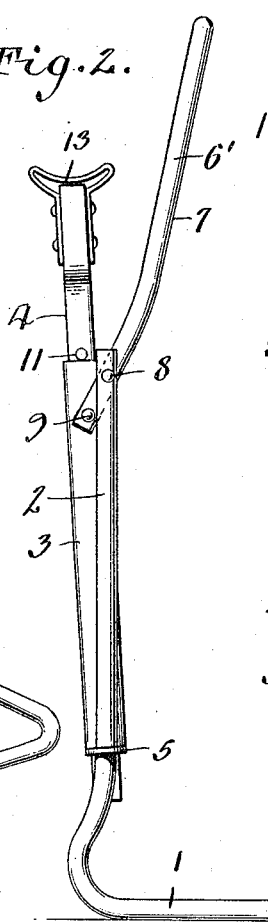
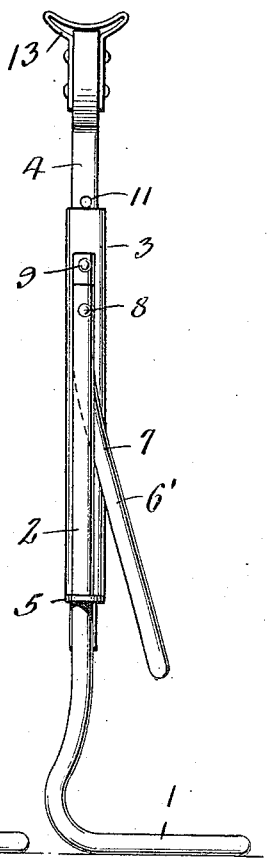
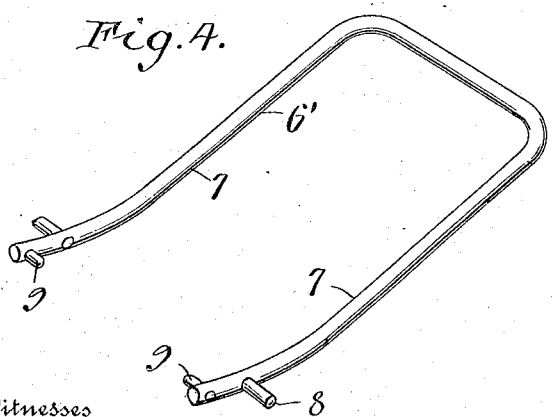
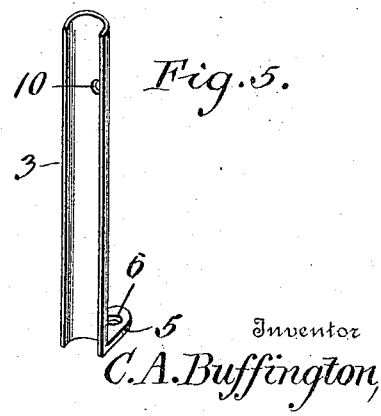
Inventor
C. A. Buffington,
By Victor J. Evans
Attorney
Witnesses

UNITED STATES PATENT OFFICE.

CALVIN A. BUFFINGTON, OF BERKSHIRE, NEW YORK.

TIRE-SAVING JACK.

1,172,934.

Specification of Letters Patent.

Patented Feb. 22, 1916.

Application filed March 27, 1915. Serial No. 17,415.

*To all whom it may concern:*

Be it known that I, CALVIN A. BUFFINGTON, a citizen of the United States, residing at Berkshire, in the county of Tioga and State of New York, have invented new and useful Improvements in Tire-Saving Jacks, of which the following is a specification.

This invention relates to tire saving jacks, the object in view being to produce a simple, cheap and effective quick action jack for the purpose stated adapted to elevate the wheel of an automobile or other rubber tired vehicle so as to remove the load from the tire, thereby saving the latter, the said jack being adapted to exert an uplift either on the axle of a vehicle or on the hub of one of the wheels or, in case the wheel is without a projecting hub, then upon the rim of the wheel at a point above the hub.

A further object of the invention is to provide means whereby the rest member of the jack or that member which is brought into bearing contact with the machine, may be adjusted in height so as to adapt the jack to axles of different heights and to the hubs or rims of wheels of different diameters.

With the above and other objects in view, the invention consists in the novel construction, combination and arrangement of parts, as herein described, illustrated and claimed.

In the accompanying drawings:—Figure 1 is a perspective view of a jack embodying the present invention. Fig. 2 is an edge view thereof showing the rest in its lowered position. Fig. 3 is a similar view showing the rest in its elevated position. Fig. 4 is a detail perspective view of the lever. Fig. 5 is a similar view of one of the runners.

The tire saving jack contemplated in this invention is constructed in the main out of resilient metal, the jack embodying a base which is substantially U-shaped as shown and formed by preference out of a steel rod. Extending upwardly from the base 1 are two substantially parallel standards or uprights 2 adapted to be sprung apart at their upper extremities for a purpose which will presently appear. Runners 3 are mounted slidably on the uprights or standards 2 and a rest 4 is held between said runners, each of said runners being substantially semicircular or U-shaped in cross section to receive the opposite edges of the rest 4 which is preferably formed of hard wood although any other material may be employed in the manufacture thereof. At their lower ends the runners 3 are provided with holes 6 to receive the standards 2 thereby enabling the runners to slide upwardly and downwardly on said standards.

6′ designates a lever which is substantially U-shaped, comprising substantially parallel arms 7 which are fulcrumed at 8 upon and adjacent to the upper extremities of the standards 2, the said arms being terminally provided with inwardly projecting pintles 9 which are inserted through holes 10 in the runners 3.

The rest 4 is provided in its opposite edges with longitudinal series of holes or sockets 11 to receive the pintles 9 which are of sufficient length to extend through the holes 10 into oppositely located holes 11 in the edges of the rest 4. By providing the series of holes 11 in the rest 4, said rest may be adjusted vertically in accordance with the height of the axle or the hub or the rim of the wheel to be supported by said rest. The pintles 9 also serve to lock the rest 4 in fixed relation to the runners 3 after the desired adjustment has been obtained.

At one end the rest 4 is shown as formed with a concaved bearing or supporting shoulder 12 shaped to fit under the projecting hub of a wheel when that end of the rest is disposed at the top of the jack. The same end of the rest 4 may be used to press upwardly beneath the top portion of the rim or felly of a wheel when there is no projecting hub, there being a number of machines now on the market and in use equipped with wheels having wire spokes, in which there is no projecting hub. At its opposite end the rest 4 is shown as provided with an axle engaging fork 13 for use when the rest 4 is inverted and it is desired to lift the axle rather than the wheel direct. When the rest is in its lowered position, and the extensions 5 are near the lower ends of the standards 2, the upper extremities of the standards may be sprung away from each other so as to disengage the pintles from the holes or sockets 11 in the rest 4. This enables the rest to be adjusted up or down and also enables said rest to be reversed end for end. The standards 2 being resilient, they are adapted to swing at their upper ends toward and away from the vehicle so that a straight uplift may be effected on the hub or rim of the wheel without displacing the jack from its lifting position and without shifting the vehicle laterally.

What I claim is:—

1. In a jack of the class specified, the combination of a supporting base, parallel standards rising therefrom in spaced relation to each other, a pair of runners slidable lengthwise of said standards, a lever fulcrumed on said standards and connected with said runners for raising and lowering the latter, and a rest held between said runners and reversible end for end and also provided at its opposite ends with bearing shoulders differing in shape.

2. In a jack of the class specified, the combination of a supporting base, parallel standards rising therefrom in spaced relation to each other, a pair of runners slidable lengthwise of said standards, a lever fulcrumed on said standards and connected with said runners for raising and lowering the latter, and a rest held between said runners and reversible end for end and also provided at its opposite ends with bearing shoulders differing in shape, one shoulder being concaved to support a wheel hub and the other being forked to engage a vehicle axle.

3. In a jack of the class specified, the combination of a supporting base, parallel standards rising therefrom in spaced relation to each other, a pair of runners slidable lengthwise of said standards, a lever fulcrumed on said standards and connected with said runners for raising and lowering the latter, and a rest held between said runners, said lever embodying substantially parallel arms terminally provided with pintles, the runners being formed with holes to receive said pintles, and the rest being formed with longitudinal series of holes to also receive said pintles to admit of the adjustment of the rest in relation to the runners.

In testimony whereof I affix my signature in presence of two witnesses.

CALVIN A. BUFFINGTON.

Witnesses:
HORATIO CLARK,
G. C. STARKMARK.

Copies of this patent may be obtained for five cents each, by addressing the "Commissioner of Patents, Washington, D. C."